United States Patent [19]

Cook

[11] 4,202,090
[45] May 13, 1980

[54] LINED CURVILINEAR SUPPORT CRADLE AND A METHOD FOR MANUFACTURING THE SAME

[75] Inventor: James S. Cook, Friendswood, Tex.

[73] Assignee: Econotherm Insulation Company, Inc., Houston, Tex.

[21] Appl. No.: 890,541

[22] Filed: Mar. 20, 1978

[51] Int. Cl.² .............................................. F16L 3/00
[52] U.S. Cl. ...................................... 29/417; 29/458; 248/49; 264/159
[58] Field of Search .................. 248/49 R; 29/527.22, 29/417, 458; 138/105, 106; 264/159

[56] References Cited

U.S. PATENT DOCUMENTS

| | | | |
|---|---|---|---|
| 14,970 | 10/1820 | Steffens | 138/105 |
| 2,850,182 | 9/1958 | Tetyak | 138/106 |
| 2,890,724 | 6/1959 | Kennedy | 248/49 |
| 2,891,749 | 5/1959 | Heverly | 248/49 |
| 3,774,281 | 11/1973 | Eliason | 248/49 |
| 3,807,458 | 4/1974 | Royston | 264/159 |
| 3,980,262 | 9/1976 | Lee | 248/49 |
| 4,017,046 | 4/1977 | Hicks | 248/49 |

Primary Examiner—Sam Silverberg
Attorney, Agent, or Firm—Arnold, White & Durkee

[57] ABSTRACT

A curvilinear cradle for supporting an object such as a pipe has a durable polyurethane elastomer lining on its concave surface to thereby prevent wear due to movement of the supported object. The cradle also has at least one mounting bracket attached to its convex surface for securing the cradle to a base object such as a pipe H frame.

A method for making the curvilinear support cradle primarily includes the steps of spinning a pipe along its longitudinal axis, bulk injecting a polyurethane elastomer into the spinning pipe to create a centrifugally spin casted coating on the inner surface of the pipe, and cutting the pipe lengthwise to obtain at least two lined cradles. Preferably one or more mounting brackets are attached to the pipe prior to the step of spinning, and the pipe is transversely divided on each side of the mounting brackets to provide a plurality of relatively shorter cradles.

18 Claims, 6 Drawing Figures

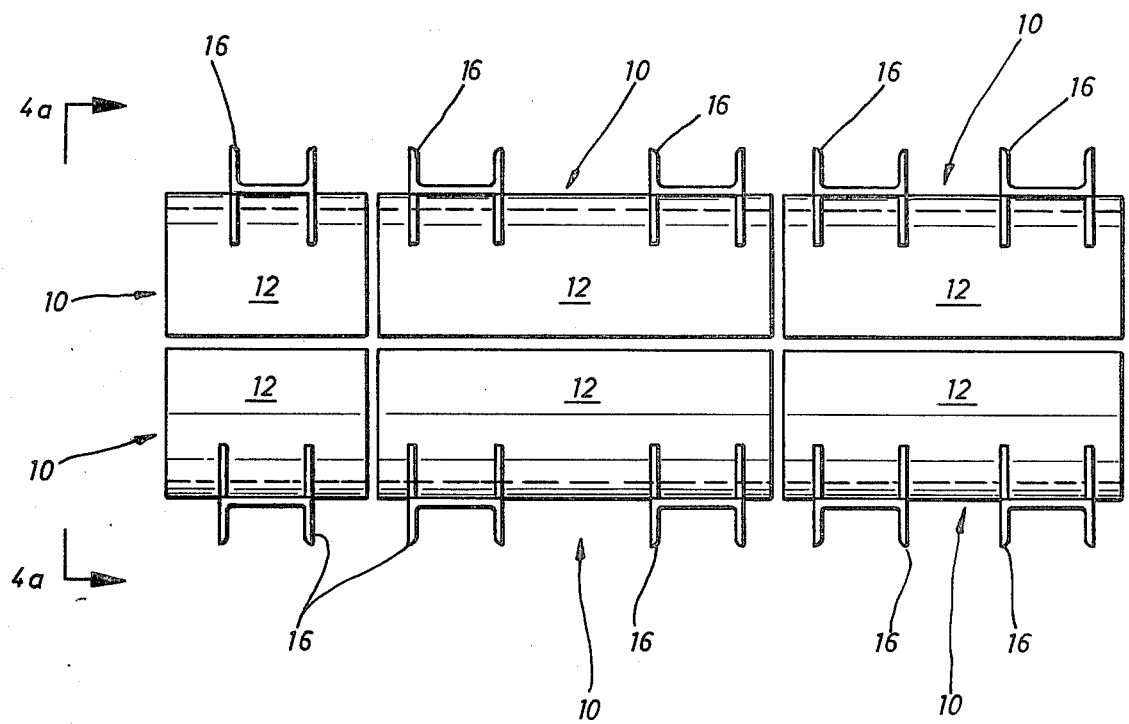
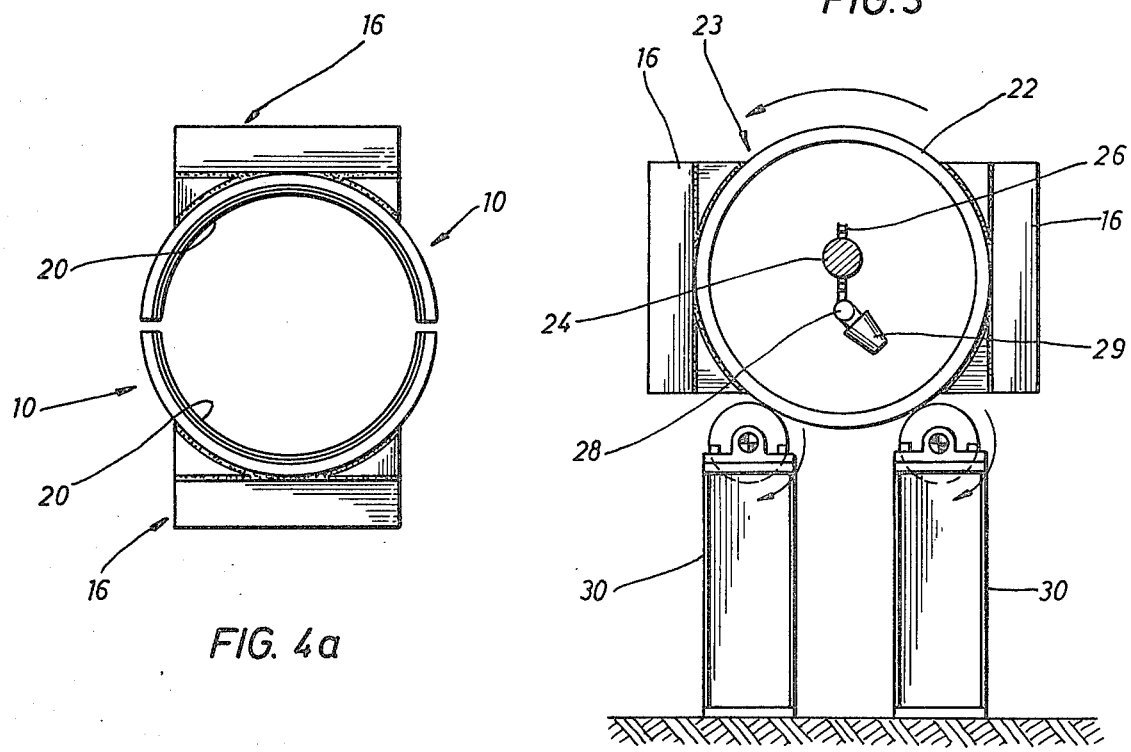

LINED CURVILINEAR SUPPORT CRADLE AND A METHOD FOR MANUFACTURING THE SAME

BACKGROUND OF THE INVENTION

This invention relates generally to curvilinear support devices and their methods of manufacture. More specifically, this invention relates to pipe support cradles and the like that are lined with a polyurethane elastomer that is applied by a bulk injected, centrifugally spin casted technique.

There is a continuing need for lining angular and curved types of support structures; for example, for lining the interior surfaces of fluid carrying pipes and for lining the concave surfaces of support cradles. Ideally the lining not only would be rugged with great wearability, but it would be manufactured onto the pipe or cradle in a manner suitable for high volume, yet inexpensive, production.

Prior art proposals have suggested the use of polyurethane foams or fibrous insulating materials as interior linings or exterior jackets. These lining materials are cellular in composition and therefore have the shortcoming of not being highly wear-resistant. The suggestions for manufacturing such support structures have included individually wrapping, molding, spraying, or pouring a coating onto each support unit. These techniques of manufacture have the shortcoming of not being conducive to high volume, inexpensive production.

There have been proposals for lining the inner surfaces of pipes by using spin casting techniques. One proposal has suggested applying a polyimide lining to a pipe interior by means of centrifugally spin casting the polyimide onto the surface. Another proposal has suggested the spin casting of a wear-resistant polyurethane elastomer onto the inside pipe surface, such as for use on a slurry line.

Although such spin casting techniques have provided wear-resistant coatings on interior surfaces, the proposals have not been adapted for high volume, batch production of curvilinear support cradles having an open, concave surface lined for wearability.

SUMMARY OF THE INVENTION

The present invention overcomes the above noted and other shortcomings of the prior art by providing a new and improved lined curvilinear support cradle having a spin casted lining and method of manufacturing the same. Spin casting a polyurethane elastomer which is bulk injected onto the surface to be coated not only produces a lining of outstanding wearability, but also enables the high volume, batch production of support cradles.

According to one aspect of the invention, a method for manufacturing a curvilinear support cradle that has a coated concave surface comprises the steps of: (1) spinning a length of pipe along its longitudinal axis; (2) bulk injecting an elastomer into the spinning pipe to form a centrifugally spin casted coating of the elastomer on the inner surface of the pipe; and (3) dividing the pipe lengthwise to create at least two curvilinear support cradles. Preferably, the elastomer is a polyurethane elastomer, and the pipe is spun at a rate within the speed range between approximately 50 and 460 revolutions per minute. The bulk injecting step is preferably continued until a coating thickness between ⅛ inch and ¾ inch is obtained.

A further aspect of the method includes the additional step of attaching at least one mounting bracket to the pipe prior to the step of spinning.

Another aspect of the method includes the additional step of heating the pipe and mounting bracket combination to above an ambient temperature prior to the step of spinning. This heating improves the capability of the pipe to bond with the elastomer. A preferred temperature range to which the pipe should be heated is between 180° F. and 215° F.

Other additional steps of the inventive method are: the cleaning, i.e. such as by sandblasting, of the inner surface of the pipe prior to the step of bulk injecting; and the step of applying a layer of urethane primer to the inner surface of the pipe before the step of bulk injecting the elastomer is performed. It is preferred that a primer layer having a thickness of approximately five mils be applied.

The method also preferably includes the step of heating the polyurethane elastomer to a temperature above ambient prior to the step of injecting. This heating improves the fluidity and bondability of the elastomer and preferably should be done within the temperature range between 180° F. and 200° F.

After the step in which the elastomer has been bulk injected and centrifugally spin casted onto the interior surface of the pipe, the method preferably includes another step of heating the elastomer to thereby cure it. The pipe and elastomer are heated to a temperature of approximately 215° F. and the temperature of the pipe is maintained at this temperature for approximately eighteen hours.

A feature of the inventive method is that it allows high volume manufacture of the support walls by using a pipe of extended length. By transversely dividing the coated length of pipe into a plurality of shorter segments of pipe with each segment containing at least one mounting bracket, a plurality of cradle pairs is provided. The step of dividing the pipe lengthwise thereupon divides the cradle pairs into pairs of cradles.

The lined curvilinear support cradles according to another aspect of the invention are to be made according to the methods defined by the above steps. Each support cradle includes a curvilinear base structure that defines a convex surface and a concave surface. At least one mounting bracket is attached to the convex surface of the base structure, and a polyurethane elastomer coating is bulk injected and centrifugally spin casted onto the concave surface of the base structure to thereby provide a wear-resistant liner. A preferred embodiment of this support cradle has a longitudinal half section of pipe as its curvilinear structure.

As is apparent from the foregoing summary, it is a general object of the present invention to provide both a novel and improved curvilinear support cradle, and method for making the same, that has a highly wear-resistant lining and that is producible in high volume batches.

Other objects and advantages and a more complete understanding of the invention may be obtained by referring to the following detailed description of a preferred embodiment when taken in conjunction with the accompanying drawings.

BRIEF DESCRIPTION OF THE DRAWINGS

FIG. 1b shows an exploded view of the embodiment shown in FIG. 1a.

FIG. 3 shows an end sectional view along line 3—3 in FIG. 2.

FIG. 4a shows an end view of a pipe with attached mounting brackets after it has been transversely and longitudinally divided.

FIG. 4b shows a side view of the structure defined in FIG. 4a.

DETAILED DESCRIPTION OF A PREFERRED EMBODIMENT

Figure 1A:
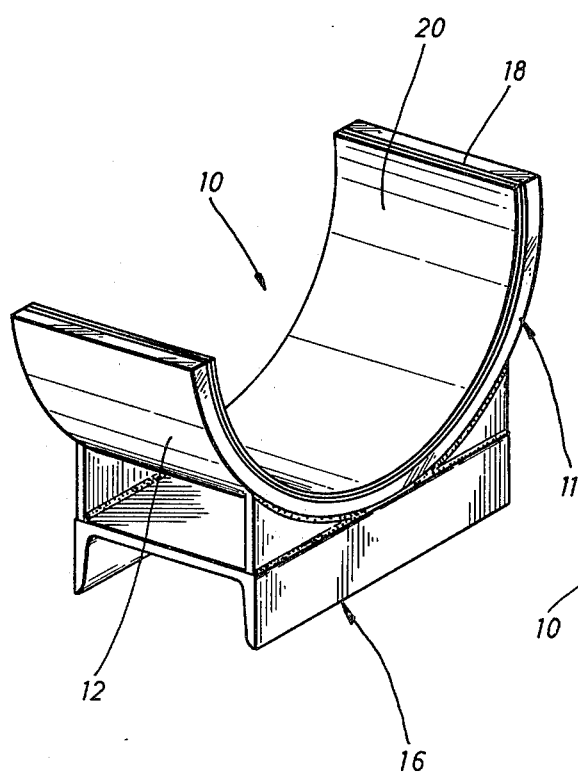
FIG. 1a shows a preferred embodiment of a lined curvilinear support cradle according to this invention.
Figure 1B:
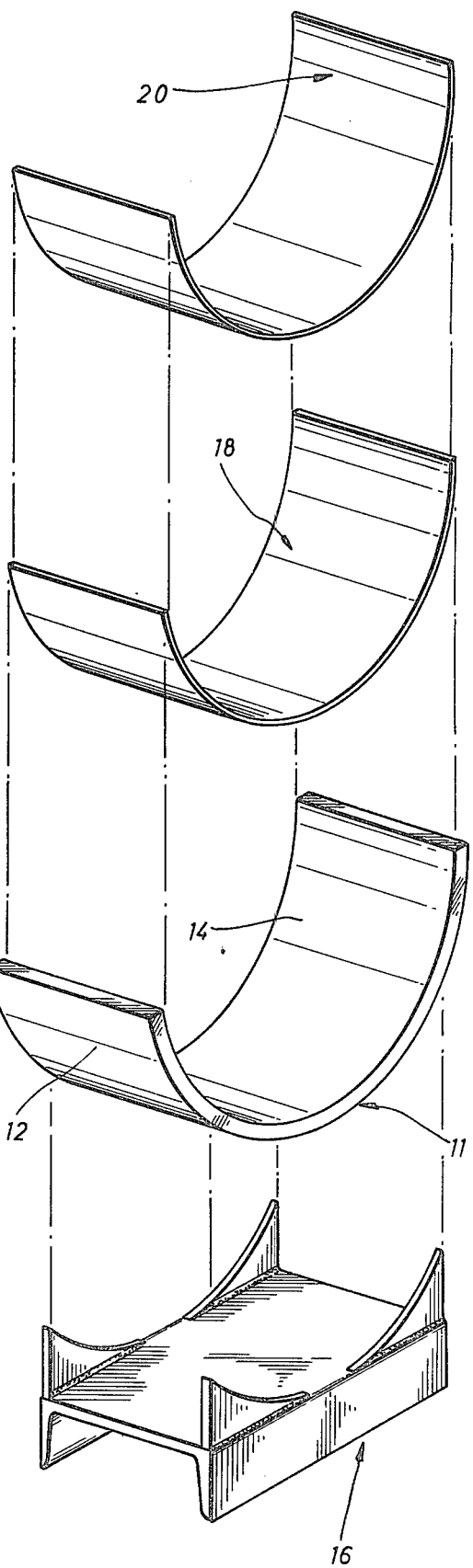

A lined curvilinear support cradle 10 constructed according to the invention is diagrammatically shown in FIGS. 1a and 1b. The cradle 10 is preferably manufactured according to FIGS. 2–4b. As the figures illustrate preferred embodiments, it is understood that the invention admits of other equally effective embodiments.

The cradle 10 includes a curvilinear base structure 11 which defines a convex surface 12 and a concave surface 14. The cradle 10 also includes at least one mounting bracket 16 that is attached to the convex surface 12, a urethane primer layer 18 that covers the concave surface 14, and a polyurethane elastomer coating 20 that is applied on top of the primer layer 18.

Figure 2:
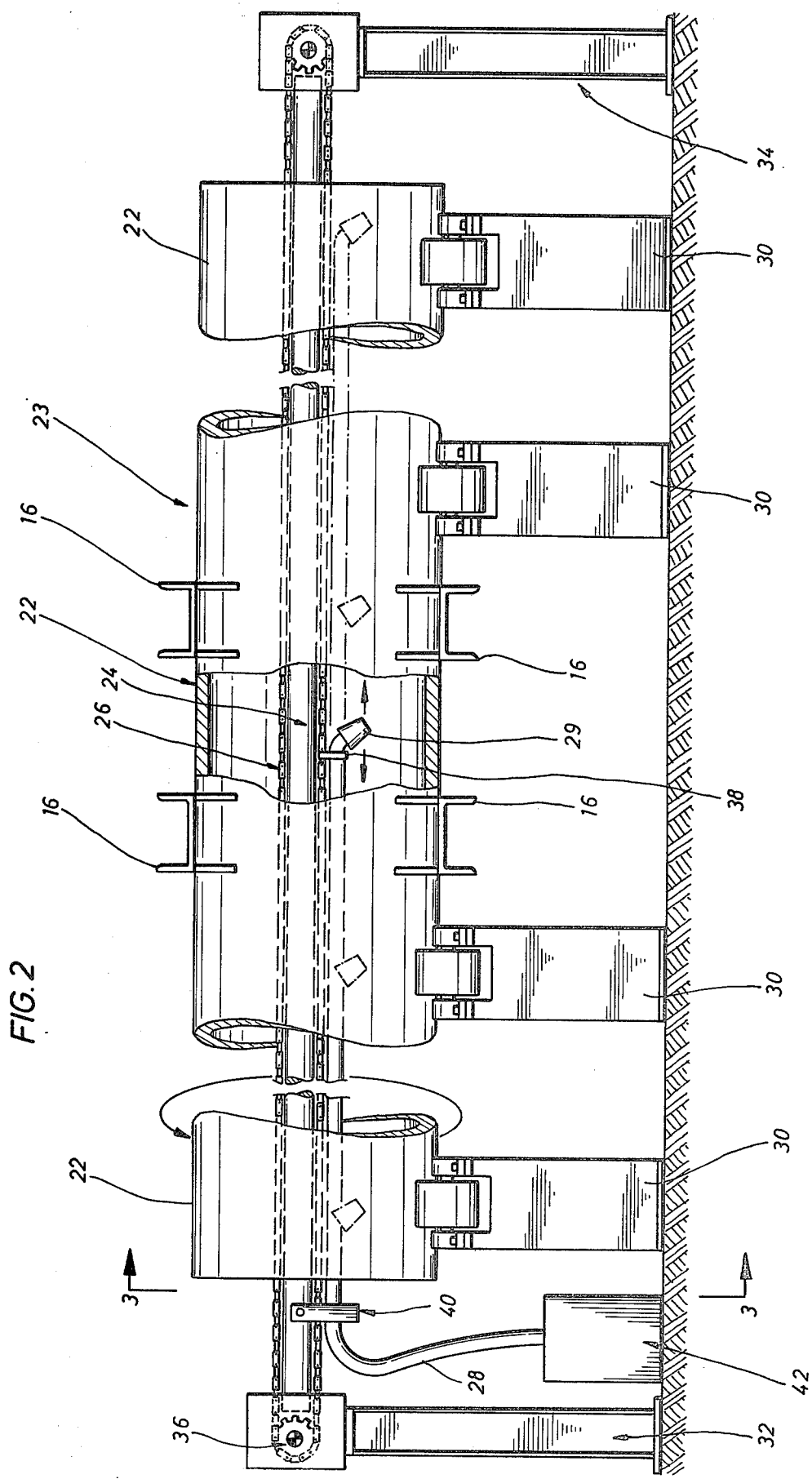
FIG. 2 schematically shows a side view, partially in section, of an apparatus for coating the interior surface of a backeted pipe according to the method of this invention.

The cradle 10 is manufactured by a method that is partially shown in FIGS. 2 and 3. Initially, a pipe 22 has the mounting brackets 16 welded or otherwise attached to it to define a combination 23. The brackets 16 are uniformly attached to the pipe 22 in a symmetrical fashion to maintain rotational stability of the pipe 22. The pipe 22 is a standard pipe and may be comprised of conventional compositions such as aluminum, copper, concrete, and all varieties of steel. Also, it is preferred that the pipe 22 have an inner diameter approximately 1 inch larger than the outer diameter of the pipe or other object to be supported.

Once the above step of attaching the brackets 16 has been completed, the combination 23 is preparatorily heated. Preferably the combination is heated to a temperature between 180° F. and 215° F. in a heating chamber having a normal atmosphere or by an otherwise appropriate manner.

After the combination 23 has been heated, the pipe 22 is placed on a plurality of pneumatic rollers 30. As FIG. 3 shows, the rollers 30 provide a rotational force for spinning the pipe 22 about its longitudinal axis.

When the pipe 22 has been placed on the rollers 30, but prior to rotation, an injector support rod 24 is inserted into the pipe along the longitudinal axis of the pipe 22. The rod 24 is supported at its ends by struts 32 and 34, and the rod 24 itself supports an injector traversing chain 26.

A motor and drive gear combination 36 is provided for driving the chain 26 about the rod 24. The combination 36 drives the chain 26 at controllably variable speeds and with reversibility of direction capabilities.

A hose 28 and an injector 29 connected thereto are used in cleaning and in coating the inner surface of the pipe 22. The hose 28 and the injector 29 are secured to the chain 26 via a first securing mechanism 38, such as a clamp. To prevent the hose 28 from dragging on the pipe 22, the hose 28 is held proximate to the rod 24 by a second securing mechanism 40. The particular hose 28 use may be changed and may be of any suitable diameter, depending upon the application. For example, the preferred embodiment of the hose 28 used to apply the elastomer coating 20 is a ½-inch diameter hose. On the other hand a standard sandblasting hose is the preferred hose embodiment for sandblasting the inner surface of the pipe 22.

The injector 29 used to apply the elastomer coating 20 has an opening that is variable in diameter between approximately 3/100 inch and ½ inch. The injector 29 used in the cleaning step is a standard sandblasting injector having two ½-inch nozzles.

Following both the placement of the pipe 22 on the rollers 30 and the insertion of the rod 24/chain 26/hose 28 apparatus into the pipe 22, the rollers 30 spin the pipe 22 along its longitudinal axis. Preferably the pipe spins between the speeds of approximately fifty revolutions per minute and 460 revolutions per minute. The exact speed for a particular application is a function of several variables such as the diameter of the pipe and the viscosity of the injected material. In general, the rotational speed is inversely proportional to the diameter of the pipe.

While the pipe 22 is rotating, its inner surface is cleaned to bare metal by sandblasting or other appropriate techniques through the appropriate hose 28 and injector 29.

Once the inner surface is cleaned, the layer of urethane primer 18 is applied through the appropriate hose 28 and injector 29. The application of the primer continues until a layer having a thickness of approximately five mils is obtained. After application, the primer layer 18 is allowed to air dry at ambient temperature. A suitable primer is the urethane primer manufactured and sold by Uniroyal Chemical Corporation.

The next step is to heat a polyurethane elastomer to a temperature between 180° F. and 200° F. in order to improve the elastomer's fluidity and bondability. The preferred type of elastomer is commercially manufactured by Uniroyal Chemical Corporation and is marketed under the trade name Viberthane. This heating process is partially done in an oven having a normal atmosphere or in an otherwise appropriate fashion. The remainder of the heating prior to the injection of the elastomer into the pipe 22 occurs in a high pressure piston metering system 42 to which the hose 28 is attached. The metering system 42 is preferably the type manufactured by Accuratio Systems, Inc. as model High Pressure Meter-Maid.

When the appropriate temperature is reached, the heated elastomer is bulk injected from the system 42 through the hose 28 and the injector 29 and into the interior of the pipe 22 and is thereby applied to the inner surface of the pipe 22.

Once the elastomer is applied, the spinning of the pipe 22 is stopped and the entire pipe combination now created is placed in an oven or otherwise appropriate heating arrangement to heat the elastomer to cure it. The heating occurs in a normal atmosphere at a temperature of approximately 215° F. for a period of approximately eighteen hours. A chemical bond forms between the pipe 22 and the elastomer as a result of this process.

After the elastomer coating 20 has cured, the pipe 22 is transversely mechanically hacksawed or otherwise divided into appropriately sized shorter segments of pipe. Next, the shorter segments of pipe are mechanically hacksawed or otherwise divided along their longitudinal axes. As shown in FIGS. 4a and 4b this final division provides a plurality of lined curvilinear support cradles 10 from a single run of the herein described preferred method.

The previously mentioned bulk injection of the elastomer is an outstanding feature of the invention because this technique of applying the urethane elastomer provides for the easy application of a non-porous, particularly durable liner. As is understood in the art, the term bulk injection refers to the introduction of a fluid in bulk or in a mass as opposed to in an aerated state, such as spraying.

Because the previous description gives only several ranges of operating parameters, an exemplary set of parameters derived from an actual production will be given at this point. The particular cradle was manufactured from a standard pipe having a twenty-seven inch inner diameter. The spinning rate was approximately sixty-five revolutions per minute and the injector traversing rate was approximately ten feet per minute. With an injector opening of approximately 3/16 inch, an elastomer coating of approximately ¼ inch was applied to the inner surface of the pipe. It is understood, however, that even this specific set of parameters is not an exact guide for every production run because the specific values for each run depend upon such variables as humidity, temperature, and atmospheric pressure.

It will thus be appreciated that a new and improved curvilinear support cradle having a durable, wear-resistant liner has been described. After attaching spaced support brackets along the pipe, and by bulk injecting a urethane elastomer into a spinning pipe and then longitudinally dividing the pipe, a pair of ruggedly lined cradles is provided. By transversely dividing the pipe into shorter sections, a plurality of such cradle pairs is provided. Thus, high volume manufacture of lined support cradles has been achieved without sacrificing the wearability of the liner.

Although the foregoing detailed description contains several parametric ranges and also exemplary parametric values, it is understood that these ranges and values are in no way limiting of the scope of this invention. Furthermore, since the foregoing description of a preferred embodiment of this invention is given with a certain degree of particularity, it is understood that numerous changes could be made to the described device and method without departing from the spirit and the scope of the invention as claimed.

What is claimed is:

1. A method for manufacturing a curvilinear support cradle having a coated, concave surface, comprising the steps of:
    spinning a length of pipe along its longitudinal axis;
    bulk injecting a polyurethane elastomer into the spinning pipe to thereby apply a centrifugally spin casted coating of the elastomer on the inner surface of the pipe; and
    dividing the length of pipe along its longitudinal axis into at least two pieces to thereby create at least first and second curvilinear support cradles.

2. The method according to claim 1, wherein the step of spinning the length of pipe includes spinning the pipe within the speed range between approximately 50 and 460 revolutions per minute.

3. The method according to claim 1, wherein the step of bulk injecting the polyurethane elastomer is continued until the thickness of the coating is between ⅛ inch and ¾ inch.

4. The method according to claim 1 and including the step of heating the pipe to above an ambient temperature prior to the step of spinning to thereby improve its bonding capability.

5. The method according to claim 4, wherein the step of heating the pipe includes heating to a temperature between 180° F. and 215° F.

6. The method according to claim 1 and including the step of cleaning the inner surface of the pipe prior to the step of bulk injecting.

7. The method according to claim 6, wherein the step of cleaning includes sandblasting the inner surface of the pipe.

8. The method according to claim 1 and including the step of applying a layer of urethane primer to the inner surface of the pipe prior to the step of bulk injecting.

9. The method according to claim 8, wherein the step of applying the layer of urethane primer includes continuing the application until a primer thickness of approximately five mils is obtained.

10. The method according to claim 1 and including, prior to the step of bulk injecting, the step of heating the polyurethane elastomer to a temperature above ambient to thereby improve its fluidity and bondability.

11. The method according to claim 10, wherein the step of heating the polyurethane elastomer includes heating to a temperature between 180° F. and 200° F.

12. The method according to claim 1 and including the step of heating the polyurethane elastomer for a determined period of time after the step of bulk injecting to thereby cure the elastomer.

13. The method according to claim 12, wherein the step of heating for curing the polyurethane elastomer includes the steps of:
    heating the pipe and elastomer to a temperature of approximately 215° F; and
    maintaining the pipe and elastomer at the 215° F. temperature for approximately eighteen hours.

14. The method according to claim 1 and including the step of attaching at least one mounting bracket to the pipe prior to the step of spinning.

15. The method according to claim 14 and including, prior to the step of longitudinally dividing the pipe, the step of transversely dividing the length of pipe into a plurality of shorter segments of pipe.

16. A method for constructing a lined curvilinear support cradle comprising the steps of:
    spinning a length of pipe along its longitudinal axis;
    bulk injecting a polyurethane elastomer into the spinning pipe to thereby apply a centrifugally spin casted coating of the elastomer on the inner surface of the pipe;
    transversely dividing the length of pipe into a plurality of shorter segments of pipe; and
    dividing the length of pipe along its longitudinal axis into at least two pieces to thereby create at least first and second lined curvilinear support cradles.

17. The method for building a lined curvilinear support cradle as defined by claim 16 and including the step of attaching at least one mounting bracket to the pipe prior to the step of spinning.

18. A method for making a lined curvilinear support cradle comprising the steps of:

attaching at least one mounting bracket to a pipe to thereby define a combination;

heating the combination to a temperature between 180° F. and 215° F. to thereby improve its bonding capability;

spinning the heated combination along the longitudinal axis of the pipe within the speed range between 50 and 460 revolutions per minute;

cleaning the inner surface of the spinning pipe to thereby prepare the surface for a primer;

applying to the inner surface of the spinning pipe a layer of urethane primer having a layer thickness of approximately five mils;

heating a polyurethane elastomer to a temperature between 180° F. and 200° F. to thereby improve its fluidity and bondability;

bulk injecting the heated elastomer into the spinning heated pipe to thereby apply on the inner surface of the pipe a centrifugally spin casted coating of the elastomer having a coating thickness between ⅛ and ¾ inch;

heating the coating of polyurethane elastomer at a temperature of approximately 215° F. for approximately eighteen hours to thereby cure the elastomer;

transversely dividing the pipe into shorter segments of pipe; and dividing the pipe along its longitudinal axis into two pieces to thereby create first and second lined curvilinear support cradles from each said shorter segment.

* * * * *